(12) United States Patent
Tate et al.

(10) Patent No.: US 11,318,985 B2
(45) Date of Patent: May 3, 2022

(54) STEERING-BY-WIRE ACTUATOR WITH LOCKING MECHANISM

(71) Applicant: SCHAEFFLER TECHNOLOGIES AG & CO. KG, Herzogenaurach (DE)

(72) Inventors: Shaun Tate, Grand Blanc, MI (US); Mark Brown, Lakewood, OH (US)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 845 days.

(21) Appl. No.: 16/169,446

(22) Filed: Oct. 24, 2018

(65) Prior Publication Data

US 2019/0118854 A1 Apr. 25, 2019

Related U.S. Application Data

(60) Provisional application No. 62/576,186, filed on Oct. 24, 2017.

(51) Int. Cl.
*B62D 5/04* (2006.01)
*B62D 5/00* (2006.01)
*F16H 25/22* (2006.01)
*B62D 7/14* (2006.01)
*F16H 25/24* (2006.01)
*F16H 25/20* (2006.01)

(52) U.S. Cl.
CPC ........... *B62D 5/0448* (2013.01); *B62D 5/001* (2013.01); *B62D 5/0451* (2013.01); *B62D 7/146* (2013.01); *F16H 25/2252* (2013.01); *B60G 2202/42* (2013.01); *B60G 2202/44* (2013.01); *B60G 2204/4191* (2013.01); *F16H 2025/2081* (2013.01); *F16H 2025/2096* (2013.01); *F16H 2025/2463* (2013.01)

(58) Field of Classification Search
CPC .... B62D 5/0448; B62D 5/001; B62D 5/0451; B62D 7/146; F16H 2025/2463; F16H 25/2252

See application file for complete search history.

(56) References Cited

U.S. PATENT DOCUMENTS 8,814,748 B2   8/2014   OSterlanger et al.
8,943,916 B2 *  2/2015   Osterlaenger .......... B60G 7/006
                                            74/89.39

(Continued)

FOREIGN PATENT DOCUMENTS

DE   102011075950 A1   11/2012
EP        2607208 A2 *  6/2013   ......... F16H 25/2454

OTHER PUBLICATIONS

English trasnlation of EP 2 607 208 from Espacenet.com (Year: 2013).*

*Primary Examiner* — Kevin Hurley
*Assistant Examiner* — Harold Eric Pahlck, III
(74) *Attorney, Agent, or Firm* — Rutan & Tucker LLP; Hani Z. Sayed

(57) ABSTRACT

A steering actuator comprising a shaft having an input coaxial with an output, wherein the output is in drivable communication with one or more wheels of a vehicle, and a locking mechanism configured to enable the shaft to rotate in both a first direction and a second direction in response to torque provided at the input, and prevent the shaft from rotating in both the first direction and the second direction in response to torque provided at the output.

20 Claims, 7 Drawing Sheets

(56) References Cited

U.S. PATENT DOCUMENTS 9,194,470 B2 11/2015 Kurz et al.
2011/0107859 A1* 5/2011 Osterlanger ........... B60G 7/006
74/89.37

* cited by examiner

STEERING-BY-WIRE ACTUATOR WITH LOCKING MECHANISM

CROSS-REFERENCE TO RELATED APPLICATIONS

This application claims the benefit of U.S. provisional application Ser. No. 62/576,186 filed Oct. 24, 2017, the disclosure of which is hereby incorporated in its entirety by reference herein.

TECHNICAL FIELD

The present disclosure relates generally to steering-by-wire actuators, for example, with locking mechanisms.

BACKGROUND

Adaptive (or active) steering systems may include steering systems for a vehicle in which the relationship between the driver's steer inputs and the angle of the steered road wheels may be supplemented or adjusted, for example, using actuators. For adaptive rear steering, this may include adjusting the non-steered wheels (e.g., the rear wheels).

SUMMARY

A first embodiment discloses a steering actuator comprising a shaft having an input coaxial with an output, wherein the output is in drivable communication with one or more wheels of a vehicle, and a locking mechanism configured to enable the shaft to rotate in both a first direction and a second direction in response to torque provided at the input, and prevent the shaft from rotating in both the first direction and the second direction in response to torque provided at the output.

A second embodiment discloses a steering actuator system that includes a planetary screw assembly having a planetary sleeve, an input and an output. The system further includes a motor configured to drive a drive pulley in communication with the motor, wherein the drive pulley is coupled to the planetary screw assembly, wherein the drive pulley is configured to rotate a pulley sleeve of the planetary screw assembly and is concentric about the planetary screw. The system also includes a wrap spring effector of the pulley sleeve, wherein the wrap spring effector is configured to rotate upon torque applied at the drive pulley. The steering actuator system also includes a wrap spring wrapped around at least a portion of the wrap spring effector on the pulley sleeve, wherein the wrap spring is configured to constrict in response to the torque applied at the pulley sleeve and rotation of the wrap spring effector on the pulley sleeve, wherein the constriction of the wrap spring allows the drive pulley to rotate the planetary sleeve, input and output of the planetary screw assembly A third embodiment discloses a steering actuator system that comprises a drive pulley coupled to a planetary screw assembly, wherein the drive pulley is configured to rotate the pulley sleeve of the planetary screw assembly and is concentric about the planetary screw assembly. The steering actuator system also includes a wrap spring effector of the pulley sleeve, wherein the wrap spring effector on the pulley sleeve is configured to rotate from a first position to a second position in response to torque applied to the pulley sleeve, and a wrap spring wrapped around the wrap spring effector on the pulley sleeve, wherein the wrap spring is configured to change from an expanded position to a constricted position in response to the wrap spring effector on the pulley sleeve rotating to the second position, wherein the constriction of the wrap spring enables the drive pulley to rotate the planetary sleeve, input and output of the planetary screw assembly.

DETAILED DESCRIPTION

Figure 1:
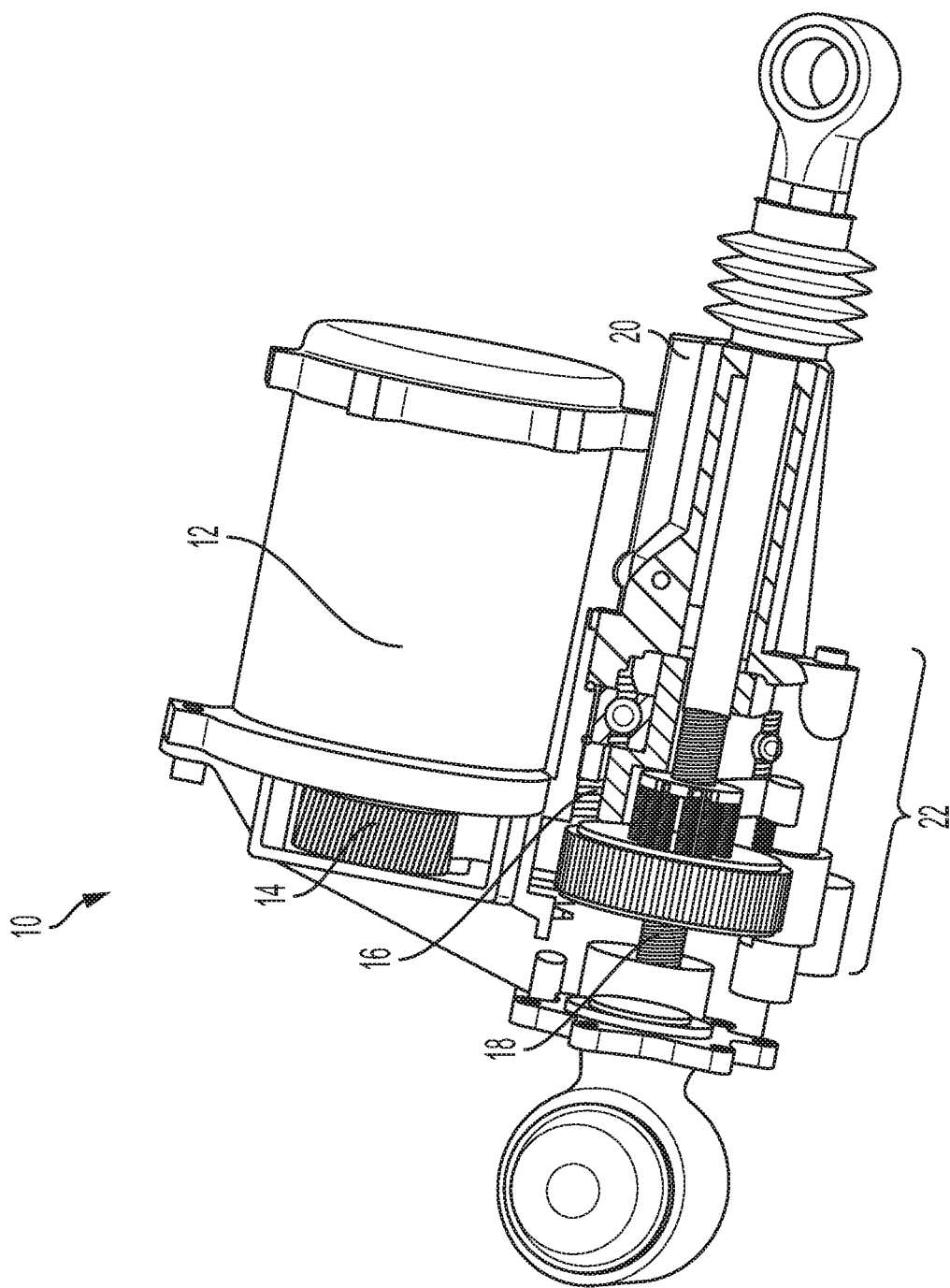
FIG. 1 is a schematic view of a steering actuator system, according to an embodiment.
Figure 2:
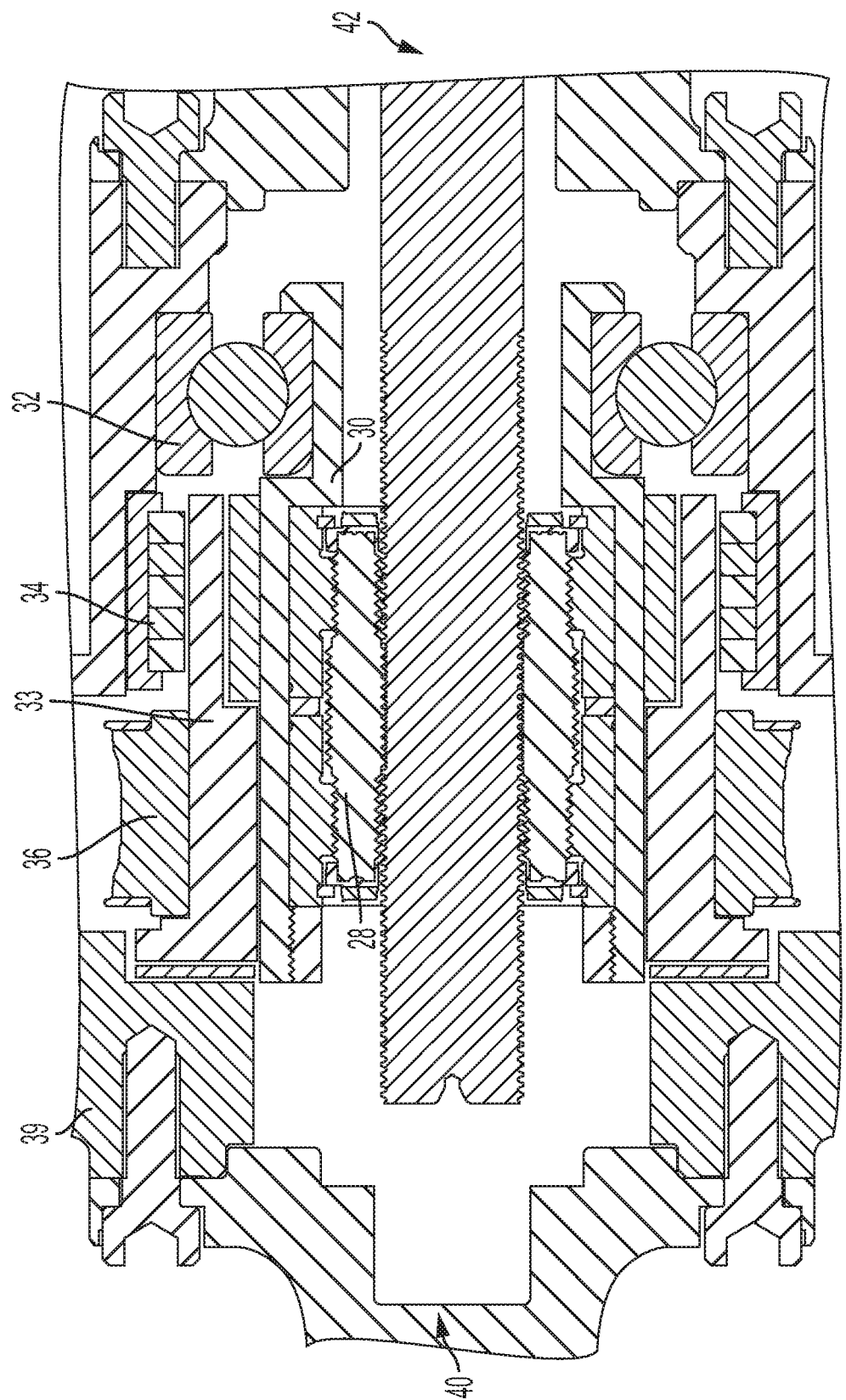
FIG. 2 is a schematic cross-section of a steering actuator system, according to an embodiment
Figure 3:
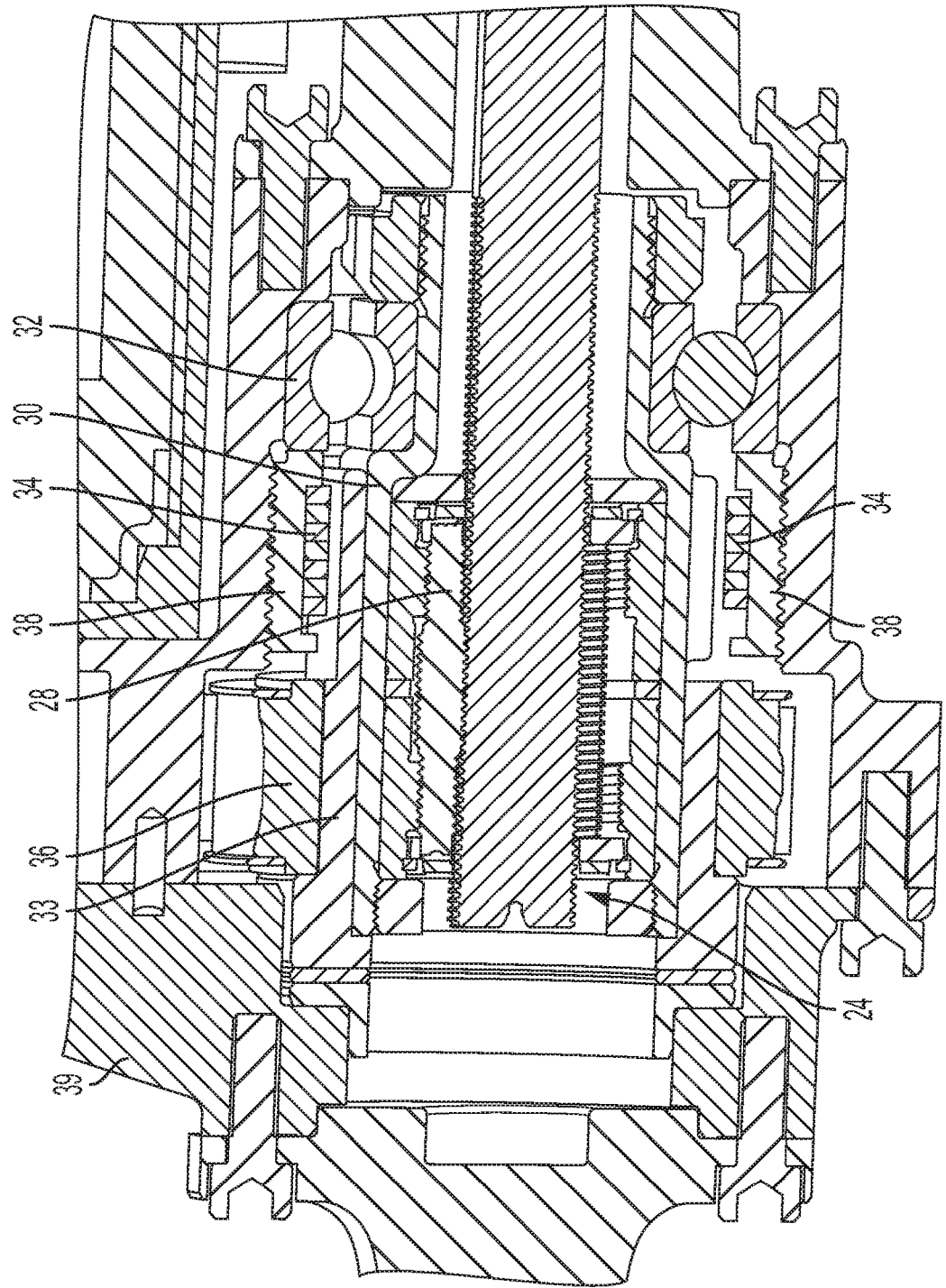
FIG. 3 is a cross-section of a steering actuator system, according to another embodiment.
Figure 4:
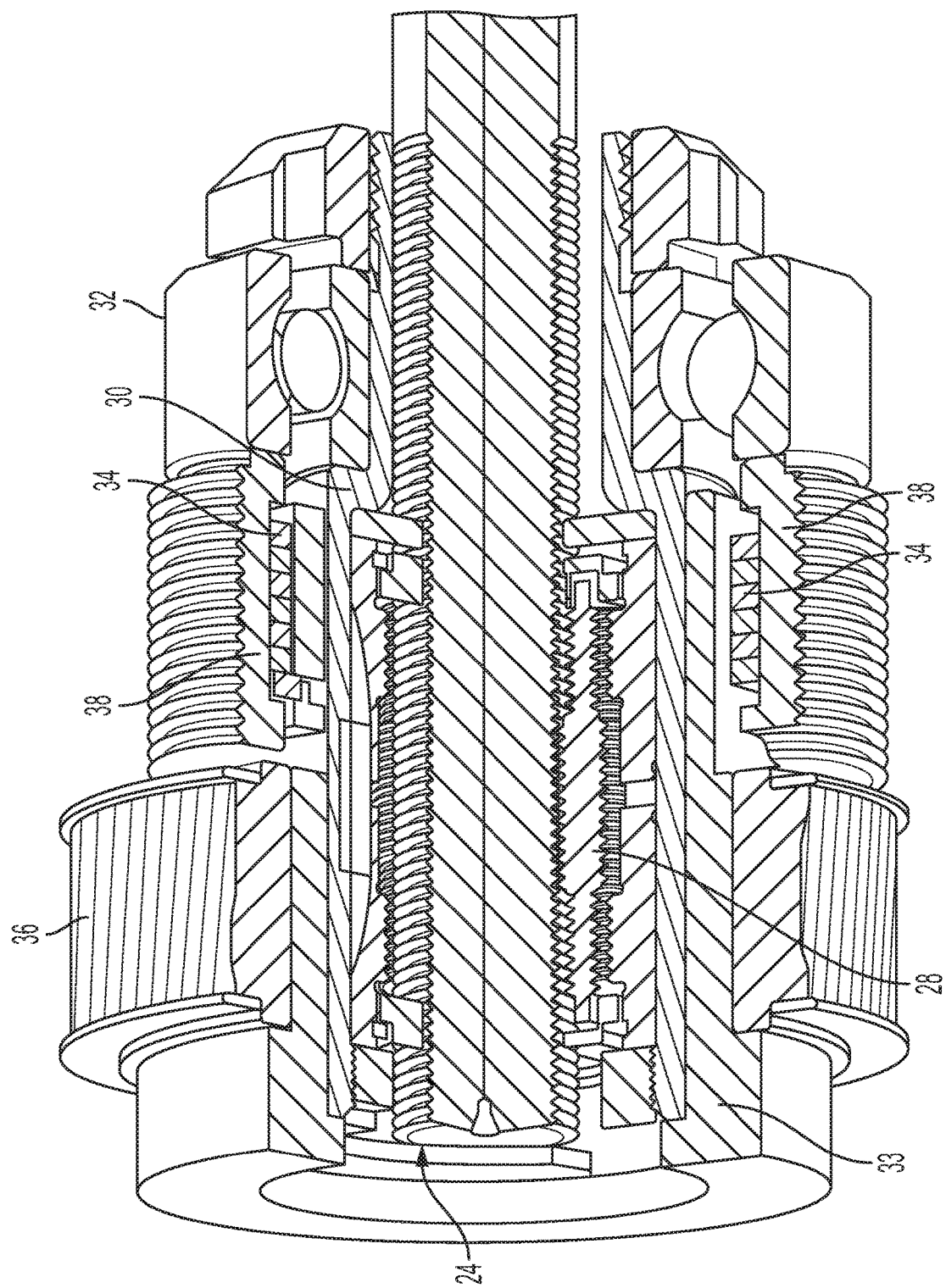
FIG. 4 is a partial cut-away view of the system of FIG. 3.
Figure 5:
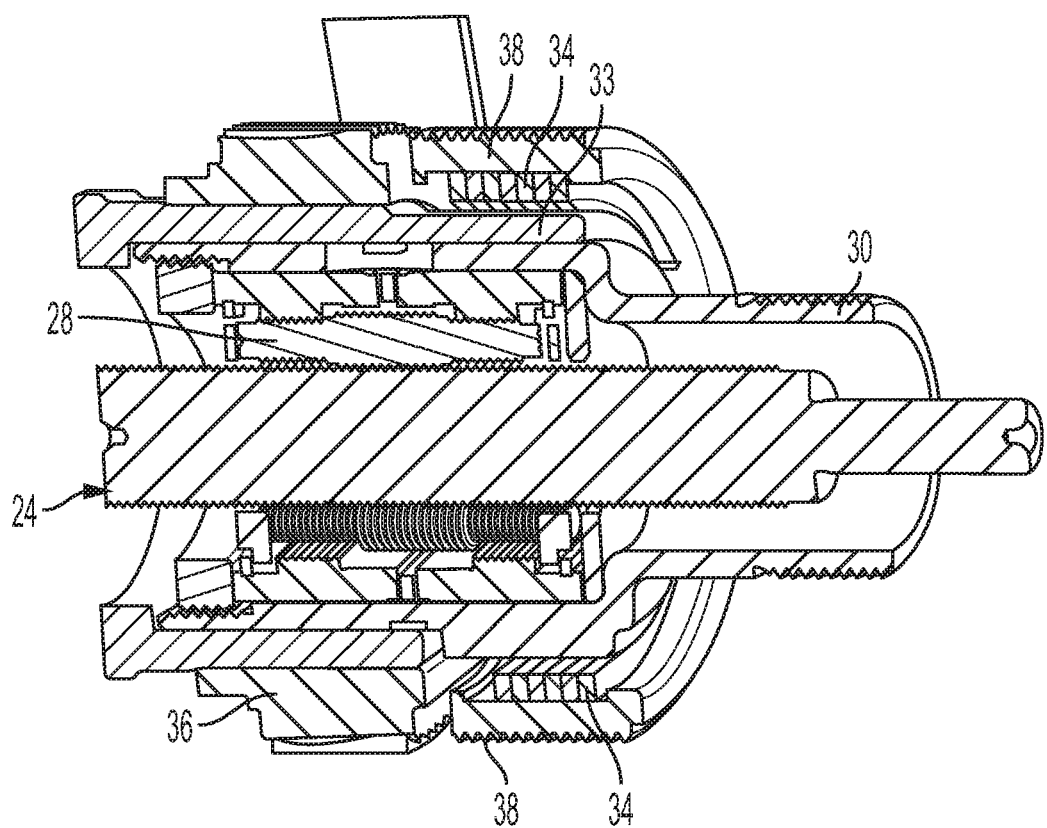
FIG. 5 is a cut-away perspective view of the steering actuator system.

At the outset, it should be appreciated that like drawing numbers appearing in different drawing views identify identical, or functionally similar, structural elements. Furthermore, it is understood that this disclosure is not limited only to the particular embodiments, methodology, materials and modifications described herein, and as such may, of course, vary. As those of ordinary skill in the art will understand, various features illustrated and described with reference to any one of the figures can be combined with features illustrated in one or more other figures to produce embodiments that are not explicitly illustrated or described.

The terminology used herein is for the purpose of describing particular aspects only, and is not intended to limit the scope of the present disclosure, which is limited only by the appended claims. It is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments.

Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Vehicle systems including an adaptive steering system may include a vehicle, which may further be connected/attached to a trailer, one or more (e.g., a plurality) of steering actuators, which may be rear steering actuators, and a control system. The control system may include one or more controllers, which may each include a processor/CPU, RAM, non-volatile memory, and wired and/or wireless networking components. Control software may be stored in the non-volatile memory, which may include algorithms for operating the adaptive steering system.

In some embodiments, rear steering actuator designs may include a ball screw type transmission with a wrap spring acting directly on the screw as an anti-back drive mechanism. However, it has been discovered that this design configuration may show issues with the durability and capacity of the wrap spring. However, while other anti-back drive mechanisms have been investigated, they are generally not as simple as a wrap spring mechanism.

In other embodiments, the actuators may utilize a lead screw type transmission. It has been found that lead screws generally have the characteristics of high capacity and self-locking ability at small screw pitch angles. It was also found that actuators of this screw type may still require a separate anti-back drive mechanism, especially under low-load and vibration. Accordingly, these two findings may suggest that the self-locking ability of a lead screw can be used to ease the requirements of any secondary anti-back drive mechanism. However, it was also found that any new innovation must be reviewed as an overall net system benefit (housing, motor, screw, locking mechanism, etc.) package, mass, and/or cost. For example, the benefit of a more efficient screw type could be offset by the addition of a more complex locking mechanism.

In at least one embodiment, a rear steer actuator should provide efficient and accurate actuation of the rear wheels to assist the front axle in steering the vehicle. It should also have a controlled response to any external load when rear wheel actuation is not desired or demanded. This anti-back drive attribute may reduce system power requirements and help the driver to bring the vehicle to a controlled stop during an electrical power failure scenario.

It has been discovered that higher efficiency ball screw transmissions may not be able to be used without a complex locking mechanism to achieve the required anti-back drive application requirements. This complex locking mechanism can have cost, mass, and package implications that may outweigh the efficiency benefits of the screw type. In contrast, low efficiency lead screw transmissions may drive very large electric motors. The electric motor may be a significant portion of the overall mass and package. Accordingly, both ball screw and lead screw transmissions may have drawbacks.

In at least one embodiment, the disclosed rear steer actuators may include planetary screw drives, which may have an efficiency between ball screw and lead screw transmissions. A planetary screw drive may also be referred to as a "PWG," as used herein. Planetary screw transmissions may be difficult to integrate with a simple locking mechanism. Typically, a sleeve may be required to hold the two nut halves of the planetary screw drive at a designated preload and the design and complexity of this sleeve may be determined by the integration of the simple locking mechanism within the system.

With reference to FIG. 1, an example of a steering actuator system 10 is shown. The system 10 may include an Electric Motor 12, which may include an electric motor, an electronic control unit, and other associated components. The system 10 may also include a belt drive 14, a locking device 16, a screw or Spindle-screw 18, a position sensor 20, and a Drive module 22. Other components are shown but not described in detail.

With reference to FIGS. 2-7, in at least one embodiment, the system 10 may include a planetary screw drive assembly 24. The planetary screw drive assembly 24 may include a screw or Spindle-screw 18 and a plurality of planetary rollers 28, as well as a planetary sleeve 30 in certain embodiments. In addition, the planetary screw drive assembly 24 may include additional components, such as retaining rings, planet rings, one or more nuts (or nut segments), spacers/washers, or others. Examples of planetary screw drives and their configuration and operation may be found in U.S. Pat. Nos. 8,814,748 and 9,194,470, issued on Aug. 26, 2014 and Nov. 24, 2015, respectively, the entire disclosures of which are incorporated by reference herein.

In at least one embodiment, the system 10 may include the combination and integration of an electric motor, a planetary screw drive, a belt drive to transfer the motor torque and speed to the screw, and a simple locking mechanism. This system may provide an overall more optimized system than those with ball screw or lead screw transmissions and may allow significant motor package and mass reduction and the use of a simple locking mechanism. This system may offer zero backlash or minimal backlash whereas the lead screw and ball screw based systems typically have backlash.

A sleeve may integrate the planetary screw drive assembly into a rear steer actuator housing. This sleeve may hold the planetary screw drive nut halves in preload against their preload spacer. The selected location of the wrap spring between the planetary screw drive sleeve belt pulley and the planetary screw drive sleeve support bearing may provide an efficient integration of the two sub-assemblies.

With reference to FIGS. 2-7, the system 10 may include the planetary screw drive 24, which includes a screw or Spindle-screw 18 and a plurality of planetary rollers 28, a planetary sleeve 30, a PWG sleeve support bearing 32, a wrap spring 34, a wrap spring pulley 36, and a housing 39. While a wrap spring 34 is shown and described herein as the locking mechanism, one of ordinary skill in the art will understand that, in view of the present disclosure, other simple locking devices may be utilized.

In operation, an electric motor, such as a brushless DC motor mounted on a parallel axis, may be controlled by an ECU. The electric motor may transfer torque and speed via belt/pulley drive to a screw axis. Torque and speed may be transferred through the wrap spring 34 only if generated by the motor on the input side.

The wrap spring 34 may be located between the drive pulley and the PWG sleeve support bearing 32. The wrap spring 34 may be connected to the wrap spring effector on the pulley sleeve and the wrap spring effector on the planetary sleeve. The wrap spring 34 may also be connected to the wrap spring brake drum 38. When torque speed comes from the pulley sleeve side (e.g. an input) the wrap spring slips relative to the wrap spring brake drum 38. When torque speed comes from planetary sleeve (e.g. an output) than the wrap spring engages with the wrap spring brake drum 38 and grounds to the housing.

The wrap spring 34 may be wire wrapped in a helix around (or partially around) parts or components that are connected to the pulley side of an actuator, as well as parts or components that are connected to the planetary screw assembly side of the actuator (e.g. wrap spring effectors on both pulley sleeve and planetary sleeve, as discussed in detail below). There may be clearance between the wrap spring 34 and the wrap spring effectors in certain embodiments. In an embodiment, the wrap spring 34 may be in contact with the wrap spring drum brake 38 via an interference fit. The wrap spring 34 may have a first end and second end. A first and second end of the wrap spring may have a bent leg. The bent leg of the first and second end may be inserted or lock into a wrap spring connector 37. The wrap spring 34 may be surrounded by a wrap spring drum 38. The wrap spring 34 may expand radially outward to prevent a planetary nut from rotating caused by resistive forces applied radially outward and grounded out to the wrap spring drum 38 and then to a housing. If the nut assembly is not able to turn based on the contact with the wrap spring 34, the pulley 36 cannot drive and make the motor spin without being powered in a control displacement. The wrap spring 34 may be helical wires that are abutted against the PWG brake drum 38. The wrap spring 34 may have a wrap spring effector 33 to drive the wrap spring 34 through the wrap spring connector 37. While the wrap spring 34 may be utilized as a locking mechanism, other examples than a wrap spring may be utilized to achieve similar functionality, namely to allow torque provided at the input shaft to rotate the input shaft and output shaft in a bi-directional manner, while also being able to prevent torque provided at the output shaft from transferring to the input shaft. The locking mechanism may be utilized on the actuator to lock-up and prevent back-drive even if the motor is not running.

The wrap spring 34 may be wrapped circumferentially with a first end and second end facing radially inward around the wrap spring 34. The first end and second end of the wrap spring may connect to a first and second wrap spring connector 37. The wrap spring connector 37 may be shaped to allow expansion or constriction of the wrap spring 34. A first end of the wrap spring 34 may be located at the back-end of the wrap spring mechanism 33, while a second end of the wrap spring 34 may be located at the front-end of the wrap spring mechanism. The wrap spring connector 37 may engage with both the effector 33 and the PWG sleeve 30 when axial forces or torque are transferred to an input shaft or output shaft of the spindle-screw 18. Thus, when back-drive occurs through the spindle-screw 18, the axial forces or torque will transfer through the nut and strengthen the wrap spring 34 to expand out and ground through the PWG sleeve/housing into the wrap spring brake drum 38. In an assembled state, there may be an interference fit between the wrap spring 34 and the planetary sleeve 30. The friction between the wrap spring 34 and the PWG sleeve 30 may engage harder if driven by the nut (e.g. via the output shaft) to prevent spinning. However, if the actuator is driven by the drive pulley 36 or motor 12, the wrap spring 34 will radially contract and reduce the friction and allow the planetary sleeve 30 to drag and rotate/spin spindle-screw 18 to translate. The wrap spring effector may be integral with a component or may be a stand alone component. For example, the effector may refer to a point of contact on a component that may meet the wrap spring (either directly or indirectly, such as contacting a wrap spring connector) to cause the wrap spring to either contract or constrict. For example, the wrap spring effector may be a protrusion of a pulley sleeve that is coupled to the drive pulley and causes constriction of the wrap spring. In another example, the wrap spring effector may be a protrusion or bump that is part of a planetary sleeve and cause expansion of the wrap spring.

The wrap spring mechanism's effector 33 may partially circumscribe the planetary sleeve 30. The wrap spring effector 33 may be hollow and/or have a protruding portion to contact the wrap spring 34 or wrap spring connector 37. The wrap spring effector 33 may drive or actuate the wrap spring 34 to radially expand or constrict. The wrap spring effector 33 may drive or engage the wrap spring 34 by contacting the ends or tangs of the wrap spring 34, both directly or indirectly. The wrap spring effector 33 may be engaged to the wrap spring 34 coaxial with a portion of the planetary sleeve 30. Thus, the wrap spring effector 33 may either turn the wrap spring on or off The planetary sleeve may change positions when an axial force or torque is transferred down a length of the actuator (e.g. the spindle-screw 18) that may be attached to the wheel. Thus, when a vehicle is being driven and the wheels may wag, a bi-directional axial load or torque may be placed on the spindle-screw 18. The bi-directional axial load or torque placed onto the spindle-screw 18 may turn the planets (e.g. planetary roller 28) and the corresponding nuts. The planetary sleeve 30 may be joined to the nut and rotate in cooperation with the wrap spring connector 37. However, when no axial force or torque is on the spindle-screw 18, the wrap spring 34 may be in a normal state/resting position.

The wrap spring 34 may constrict (e.g. reduce its diameter) when the motor 12 is activated to allow both the input shaft and the output shaft of the spindle-screw 18 to rotate and translate. The motor may be activated based on a signal from another sensor/controller in the vehicle. The motor may rotate the drive pulley 24 in the opposite direction of the axial force in the spindle-screw 18. When the pulley engages it may rotate the wrap spring effector in an opposite direction from the input of the wheel. Thus, driving the wrap spring effector 33 may allow a locking mechanism to be open, while closing down the diameter may transmit torque to the planetary sleeve 30. The locking mechanism may operate without any power from the motor being needed.

The planetary sleeve 30 may houses the planetary screw drive 24, which may include a nut or two separate nut halves that are preloaded against a spacer, a spindle-screw 18, and a number of planetary rollers 28. The torque may be received by the sleeve 30, which may be connected to the nut or two separate nut halves.

The planetary sleeve 30 may be supported and guided radially and axially relative to the housing 38 by the planetary sleeve support bearing 32. The Spindle-screw 18 may translate, according to its design and torque and speed input at the nut, along its axis with relative motion to the housing 39. The spindle-screw 18 translation may provide actuation for steering motion of the wheels. The planetary sleeve support bearing 32 supports and allows rotation upon axial and radial loads from the 18. A separate support bearing may also be circumscribing a pulley sleeve and/or the wrap spring effector. The support bearing that circumscribes the pulley sleeve may be utilized to support and allow rotation upon axial and radial loads.

In one embodiment, the disclosed system includes a combination and integration of a planetary screw drive (PWG screw) together with a simple locking mechanism (e.g. a wrap spring 34) to meet steer-by-wire application requirements. Specifically, the wrap spring 34 may be positioned between the drive pulley 36 and the planetary sleeve support bearing 32, which may provide an efficient integration and enable an optimal sleeve design. The overall system combination and layout may allow for a large amount of the planetary screw drive efficiency advantage over a lead screw to be realized.

At each end of the actuator system may be a connection to other parts of the vehicle. At a first end, there may be an inboard connection 40. The inboard connection 40 may connect to the vehicle chassis or frame. On the opposite end may be an outboard connection 42. At the outboard connection 42, the actuator may be coupled to the wheels of a vehicle via the planetary screw assembly 24 or a knuckle coupled to the planetary screw assembly 24. The outboard connection 42 or output shaft may be utilized to turn wheels in or out of a car (e.g. the rear wheels.) A vehicle's driving environment, however, may cause axial forces or torque to be applied at the output shaft due to bumpy roads or other road surfaces, which creates back-drive. The input shaft and output shaft may be an integral shaft or may be separate parts that are joined together.

Figure 6:
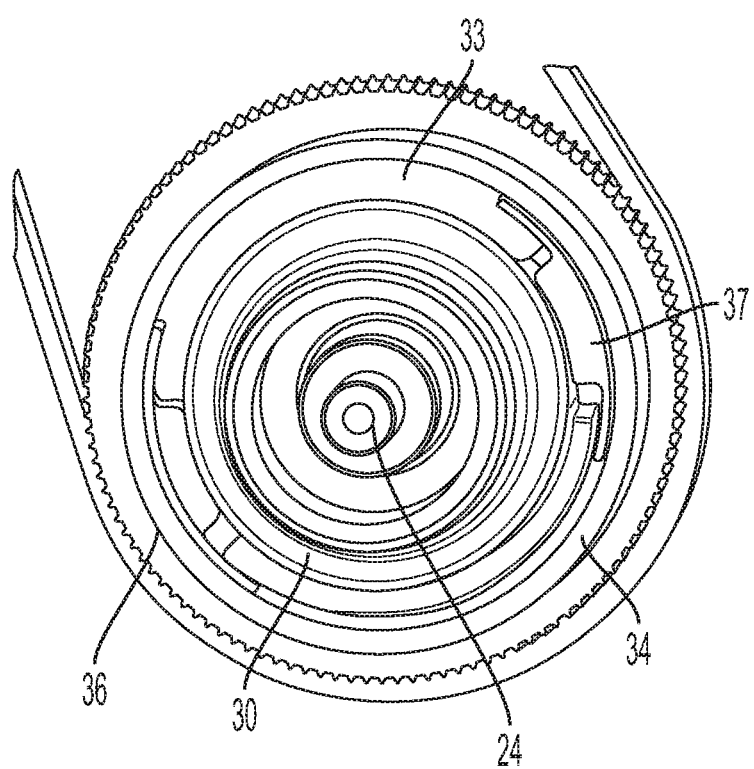
FIG. 6 is a front perspective view of the steering actuator system.
Figure 7:
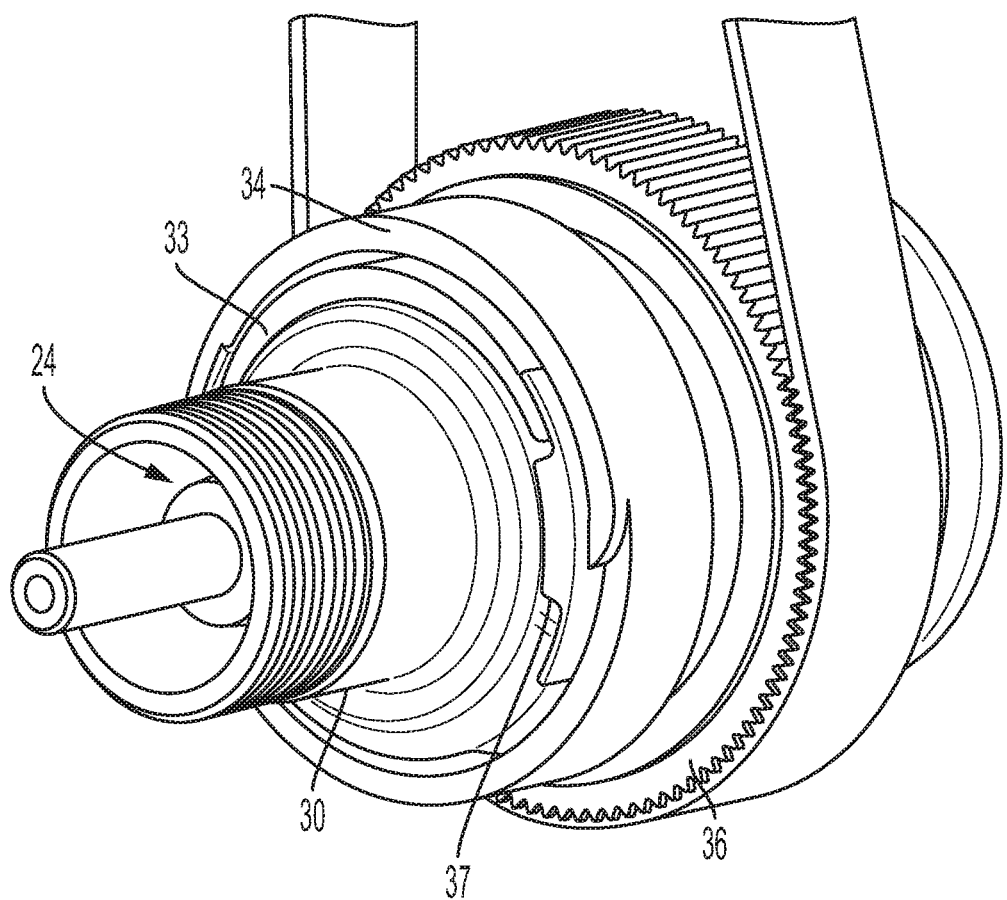
FIG. 7 is a side perspective view of the steering actuator system with components removed for illustrative purposes.

As shown in FIG. 6 and FIG. 7, the wrap spring 34 may have ends that engage with a wrap spring connector 37. The wrap spring connectors 37 may be separate components (as shown) or may be integrated with the wrap spring effector 33. The wrap spring connectors 37 may have a protruding portion that protrudes radially inward. The protruding portion of the wrap spring connectors 37 may become in contact with the wrap spring effector 33 when the drive pulley rotates to allow the input shaft and output shaft to rotate. On the other hand, the wrap spring connectors 37 may also become in contact with the planetary sleeve 30 in order to prevent the input shaft from rotating when the output shaft has axial forces or torque applied at the wheels of the vehicle. Thus, the protruding portion of the wrap spring connectors 37 may become in contact with the planetary sleeve 30.

In one embodiment, an input driven from the motor 18 or drive pulley 36 may case the pulley sleeve to rotate. A wrap spring effector on the pulley sleeve engages with the wrap spring 34 in a manner that causes a radial contraction of the wrap spring 34. In some embodiments, the wrap spring effector 33 may engage with a wrap spring connector 37 to cause the radial contraction of the wrap spring 34. The radial contraction allows for the wrap spring 34 to slip on the wrap spring drum brake 38 and rotation of the pulley sleeve progresses. The further rotation of the pulley sleeve and wrap spring effector on the pulley sleeve makes contact to a wrap spring effector on the planetary sleeve. The result may cause rotation of the planetary sleeve 30 and connected planetary screw input, which ultimately may result in a rotation of the planetary screw output and linear displacement of the spindle-screw 18.

In another embodiment, an external force may act on the spindle-screw 18. This axial force component on the spindle-screw 18 may result in a rotation on the planetary nut sleeve. The wrap spring effector on the planetary sleeve engages with the wrap spring, sometimes through a wrap spring connector, in a way that may cause a radial expansion of the wrap spring 34. The radial expansion brakes the wrap spring 34 against the wrap spring drum brake 38, which is grounded to the housing. This may result in preventing further rotation of the planetary screw to take place, thus preventing linear displacement of the spindle-screw 18.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

Parts List

10 Steering Actuator System
12 Electric Motor
14 Belt Drive
16 Locking Device
18 Spindle-screw
20 Position Sensor
22 Drive Module
24 Planetary Screw Assembly
28 Planetary Rollers
30 Planetary Sleeve
32 Planetary Sleeve Support Bearing
33 Wrap Spring Effector
34 Wrap Spring
36 Drive Pully
37 Wrap Spring Connector
38 Wrap Spring Brake Drum
39 Housing
40 Inboard Connection
42 Outboard Connection

What is claimed is:

1. A steering actuator system, comprising:
a planetary screw assembly having a planetary sleeve, an input and an output;
a motor configured to drive a drive pulley in communication with the motor, wherein the drive pulley is coupled to the planetary screw assembly, wherein the drive pulley is configured to rotate a pulley sleeve of the planetary screw assembly and is concentric about the planetary screw;
a wrap spring effector of the pulley sleeve, wherein the wrap spring effector is configured to rotate upon torque applied at the drive pulley; and
a wrap spring wrapped around at least a portion of the wrap spring effector on the pulley sleeve, wherein the wrap spring is configured to constrict in response to the torque applied at the pulley sleeve and rotation of the wrap spring effector, wherein the constriction of the wrap spring allows the drive pulley to rotate the planetary sleeve, input and output of the planetary screw assembly.

2. The steering actuator system of claim 1, wherein the wrap spring is configured to expand in response to torque being applied by the output and further in response to rotation of the planetary sleeve and a planetary sleeve effector configured to expand the wrap spring and prevent the input from rotating and a spindle-screw of the planetary screw assembly from translating.

3. The steering actuator system of claim 1, wherein the motor is configured to drive the drive pulley when the motor is activated, wherein the wrap spring effector on the pulley sleeve rotates and causes the wrap spring to constrict upon the drive pulley being driven by the motor.

4. The steering actuator system of claim 1, wherein the pulley sleeve is configured to rotate and expand the wrap spring upon torque being transferred to the output when the motor is not driving the drive pulley, wherein the expansion of the wrap spring prevents the input from rotating.

5. The steering actuator system of claim 1, wherein the wrap spring is located axially between the drive pulley and a support bearing that surrounds the planetary screw assembly.

6. The steering actuator system of claim 1, wherein a wrap spring brake drum is located axially between a support bearing and the drive pulley, wherein the support bearing is circumscribing the planetary screw assembly.

7. The steering actuator system of claim 1, wherein the wrap spring includes a first and second end and a first and second wrap spring connector is located at the first and second end of the wrap spring.

8. The steering actuator system of claim 7, wherein the first wrap spring connector is configured to contact the wrap spring effector on the pulley sleeve and constrict the wrap spring in response to rotation of the pulley sleeve.

9. The steering actuator system of claim 1, wherein the wrap spring and a wrap spring brake drum are in contact via an interference fit.

10. A steering actuator system, comprising:
a drive pulley coupled to a planetary screw assembly, wherein the drive pulley is configured to rotate a pulley sleeve of the planetary screw assembly;
wrap spring effector of the pulley sleeve, wherein the wrap spring effector on the pulley sleeve is configured to rotate from a first position to a second position in response to torque applied to the pulley sleeve; and
wrap spring wrapped around the wrap spring effector on the pulley sleeve, wherein the wrap spring is configured to change from an expanded position to a constricted position in response to the wrap spring effector on the pulley sleeve rotating to the second position, wherein the constriction of the wrap spring enables the drive pulley to rotate the planetary sleeve, input and output of the planetary screw assembly.

11. The spring actuator system of claim 10, wherein the wrap spring is configured to change from the constricted position to the expanded position in response to torque being applied by the output, and the expansion of the wrap spring prevents the input from rotating and a spindle-screw of the assembly from translating.

12. The steering actuator of claim 10, wherein the wrap spring is axially between the drive pulley and a planetary sleeve support bearing, wherein the drive pulley and the planetary sleeve support bearing are concentric about the planetary screw.

13. The steering actuator of claim 10, wherein a wrap spring brake drum is axially between the pulley and a planetary sleeve support bearing, wherein the wrap spring brake drum is concentric about the wrap spring.

14. The steering actuator of claim 13, wherein an interference fit exists between the wrap spring and the wrap spring drum brake.

15. The steering actuator of claim 10, wherein the wrap spring includes a first end and a second end, wherein the first end and second end are attached to a wrap spring connector that are located between the wrap spring effector on the pulley sleeve and planetary sleeve wrap spring effector.

16. The steering actuator of claim 15 wherein the wrap spring effector on the pulley sleeve and the planetary sleeve wrap spring effector are configured to actuate the wrap spring utilizing the wrap spring connector.

17. A steering actuator comprising:
a shaft having an input coaxial with an output, wherein the output is in drivable communication with one or more wheels of a vehicle;
a locking mechanism configured to enable the shaft to rotate in both a first direction and a second direction in response to torque provided at the input, and prevent the shaft from rotating in both the first direction and the second direction in response to torque provided at the output,
wherein the locking mechanism includes a wrap spring effector coupled to a drive pulley; and
a wrap spring at least partially wrapped around the wrap spring effector on a pulley sleeve.

18. The steering actuator of claim 17,
wherein the wrap spring is configured to constrict via rotation of the wrap spring effector coupled to the pulley sleeve when torque is transferred from the input to the output of a planetary screw to allow both the input and output to rotate.

19. The steering actuator of claim 17, wherein the steering actuator further includes a motor, and the locking mechanism is configured to allow torque provided at the input to rotate the input and output when the motor is on and the locking mechanism is further configured to prevent torque provided at the output from transferring to the input when the motor is off.

20. The steering actuator of claim 17, wherein the one or more wheels of a vehicle are one or more rear wheels.

* * * * *